United States Patent
Yang

(10) Patent No.: US 10,873,078 B2
(45) Date of Patent: *Dec. 22, 2020

(54) COMPOSITE ELECTRODE MATERIALS WITH IMPROVED STRUCTURE

(71) Applicants: PROLOGIUM TECHNOLOGY CO., LTD., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); Prologium Holding Inc., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/585,376

(22) Filed: Sep. 27, 2019

(65) Prior Publication Data

US 2020/0144607 A1 May 7, 2020

(30) Foreign Application Priority Data

Nov. 6, 2018 (TW) .............................. 107139243 A

(51) Int. Cl.
| | |
|---|---|
| *H01M 4/36* | (2006.01) |
| *H01M 4/62* | (2006.01) |
| *H01M 10/0565* | (2010.01) |
| *H01M 10/0562* | (2010.01) |
| *H01M 10/0566* | (2010.01) |

(52) U.S. Cl.
CPC ............ *H01M 4/366* (2013.01); *H01M 4/62* (2013.01); *H01M 10/0562* (2013.01); *H01M 10/0565* (2013.01); *H01M 10/0566* (2013.01); *H01M 2300/0045* (2013.01); *H01M 2300/0071* (2013.01); *H01M 2300/0082* (2013.01); *H01M 2300/0085* (2013.01); *H01M 2300/0094* (2013.01)

(58) Field of Classification Search
None
See application file for complete search history.

(56) References Cited

U.S. PATENT DOCUMENTS

| | | | | |
|---|---|---|---|---|
| 10,637,049 B2* | 4/2020 | Yang | .................... | H01M 10/058 |
| 2002/0012846 A1* | 1/2002 | Skotheim | ................ | H01M 6/40 |
| | | | | 429/231.95 |

(Continued)

FOREIGN PATENT DOCUMENTS

| | | |
|---|---|---|
| CN | 103069639 A | 4/2013 |
| CN | 103718337 A | 4/2014 |

*Primary Examiner* — Tracy M Dove
(74) *Attorney, Agent, or Firm* — Rabin & Berdo, P.C.

(57) ABSTRACT

The invention discloses a composite electrode materials with improved structure. The composite electrode materials of this invention includes at least one active material. The active material is coated an artificial passive film on its surface to effectively prevent or reduce the contact of the electrolyte and the active material to avoid unnecessary consumption of Li-ions. Also, there have a middle layer and an outer layer outside of the artificial passive film. Both of the middle layer and the outer layer are composed of the deformable electrolyte and the undeformable electrolyte, but with different concentration ratios. Therefore, the better ion-conduction is achieved with reduced charge-transfer resistance and reduced usage amount of organic solvent.

17 Claims, 3 Drawing Sheets

(56) References Cited

U.S. PATENT DOCUMENTS

2013/0017441 A1    1/2013   Affinito et al.
2013/0149593 A1    6/2013   Hayashi et al.
2016/0020460 A1*   1/2016   Yang .................. H01M 10/052
                                                           429/231.95
2016/0372743 A1   12/2016   Cho et al.

* cited by examiner

COMPOSITE ELECTRODE MATERIALS WITH IMPROVED STRUCTURE

CROSS REFERENCES TO RELATED APPLICATIONS

The present application claims priority to Taiwanese Patent Application 107139243 filed in the Taiwanese Patent Office on Nov. 6, 2018, the entire contents of which is being incorporated herein by reference.

BACKGROUND OF THE INVENTION

Field of Invention

The present invention relates to an electrode materials, in particular to a composite electrode materials with improved structure adapted for a lithium ion secondary battery system.

Related Art

The liquid electrolyte is usually used for the existing lithium ion secondary battery as a medium for the lithium ion transport. However, the volatile nature of the liquid electrolyte may adversely affect the human body and the environment. Moreover, it is also a great security concern for the battery users due to the flammability of the liquid electrolyte.

Furthermore, one reason for the destabilization of lithium batteries is the greater surface activity of the negative electrode and the higher voltage of the positive electrode. When the liquid electrolyte is directly contacted to the electrodes, the interfaces therebetween is destabilized and the exothermic reaction is occurred to form a passivation layer. These reactions would consume the liquid electrolyte and the lithium ion and generate heat. When a local short circuit occurs, the local temperature rises rapidly. The passivation layer will become unstable and release heat. This exothermic reaction is cumulative to cause the temperature of the whole battery to continue to rise. The one of safety concerns of using a battery is that once the battery temperature is increased to a starting temperature (trigger temp.), the thermal runaway is initiated to cause an ignition or explosion of the battery. That is a major safety issue for using.

In recent years, the solid electrolytes is a focusing research. The ionic conductivity of the solid electrolytes are similar to the ionic conductivity of the liquid electrolytes, without having the properties of evaporating and burning. Also, the interfaces between the solid electrolytes and the surface of active materials are relatively stable, regardless chemically or electrochemically. However, differing from the liquid electrolyte, the contact area between the solid electrolytes with the active materials is quite small, the contact surface is poor, and the charge transfer coefficient is low. So there is a problem that the charge transfer interface resistances of the active materials with the positive and negative electrodes are large. It is adverse for the efficient transmission of lithium ions. Therefore, it is still difficult to completely replace the liquid electrolytes by the solid electrolytes.

To solve the above-mentioned problems, the Applicant provide a composite electrode materials, such as U.S. application Ser. No. 16/253,928, constructed with different percentages of the solid electrolyte and the gel/liquid electrolyte. Therefore, the better ion-conduction is achieved with reduced charge-transfer resistance and reduced amount of organic solvent. However, if the amount of organic solvent can be further reduced, the safety, and stability of the lithium battery would be greatly improved.

SUMMARY OF THE INVENTION

It is an objective of this invention to provide a composite electrode materials with improved structure to overcome the forgoing shortcomings. The artificial passive film (APF) is used to efficiently prevent the liquid electrolytes to contact with the active materials. Therefore, the unnecessary lithium ion consumption and the attenuation of the lithium battery can be avoided.

Also, it is another objective of this invention to provide a composite electrode materials with improved structure including a middle layer and an outer layer constructed with different percentages of the dual-type electrolyte. Therefore, the problems of the high resistance of the charge transfer and small contact area, caused by the directly contact of the solid electrolyte and the active material, are eliminated. The amount of organic solvents is reduced, and the safety of the battery is improved.

In order to implement the abovementioned, this invention discloses a composite electrode materials with improved structure, which includes an active material, an artificial passive film, a middle layer and an outer layer. The artificial passive film covers the active material, and the middle layer and the outer layer cover outside in sequence. Both the middle layer and the outer layer include an undeformable electrolyte and a deformable electrolyte. The content of the deformable electrolyte is more than a content of the undeformable electrolyte in middle layer. The content of the undeformable electrolyte is more than the content of the deformable electrolyte in outer layer. The active material is coated an artificial passive film on its surface to effectively block the contact of the electrolyte and the active material to prevent unnecessary consumption of Li-ions, which may lead the attenuation of the lithium battery. At same time, the middle layer and the outer layer is formed with different concentration ratios. The amount of the gel/liquid electrolytes is significant reduced. In addition, the problems of the high resistance of the charge transfer and small contact area, caused by the directly contact of the solid electrolyte and the active material, are eliminated. Therefore, the better ion-conduction is achieved with improved safety.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The invention provides a composite electrode materials with improved structure. Both the solid electrolytes and the gel/liquid electrolytes have their own advantages and disadvantages. Nowadays, it is still difficult to completely replace the gel/liquid electrolytes by the solid electrolytes. Therefore, it is a more appropriate way to mix with the solid electrolytes and the gel/liquid electrolytes. The advantages of both these two kind of electrolytes are utilized by distribution configuration with different percentages, and the disadvantages of the electrolytes are eliminated or minimized to achieve better ion-conduction. Also, it is considered that the disadvantages of the active materials and the gel/liquid electrolytes would form a passive protective film. The artificial passive film (APF) is used to efficiently reduce or prevent the gel/liquid electrolytes to contact with the active materials. The following is a description of the active material structure and the electrode structure.

Figure 1:
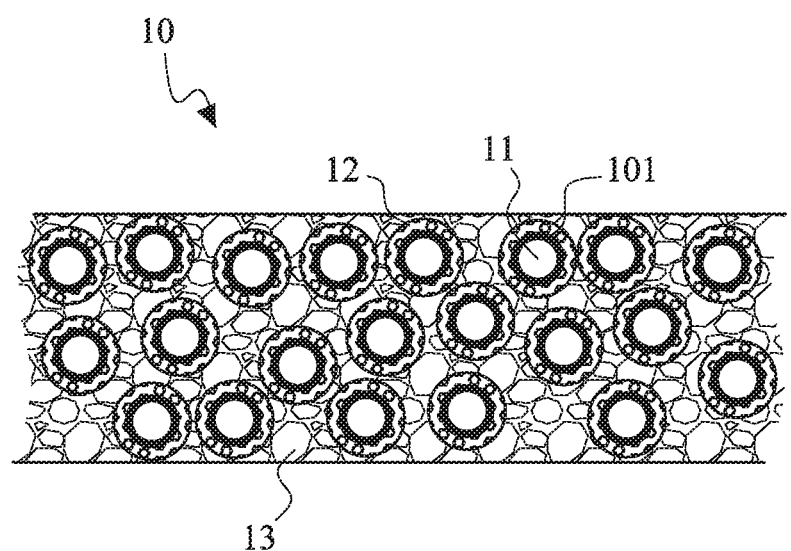
FIG. 1 is a schematic diagram of the composite electrode materials with improved structure of this invention
Figure 2:
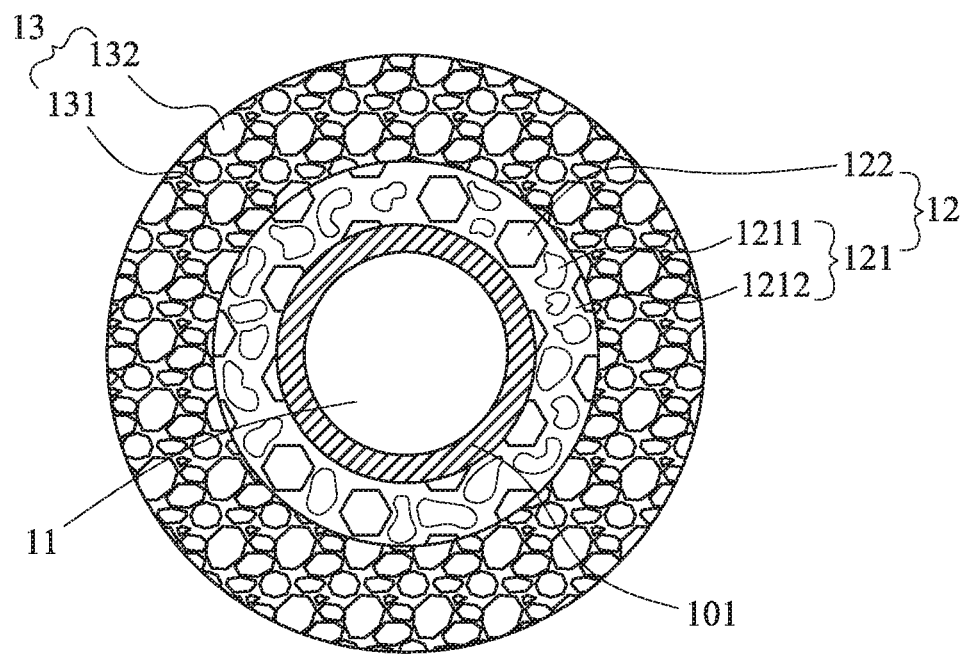
FIG. 2 is a schematic diagram with partial enlargement of the composite electrode materials with improved structure of this invention.
Figure 3:
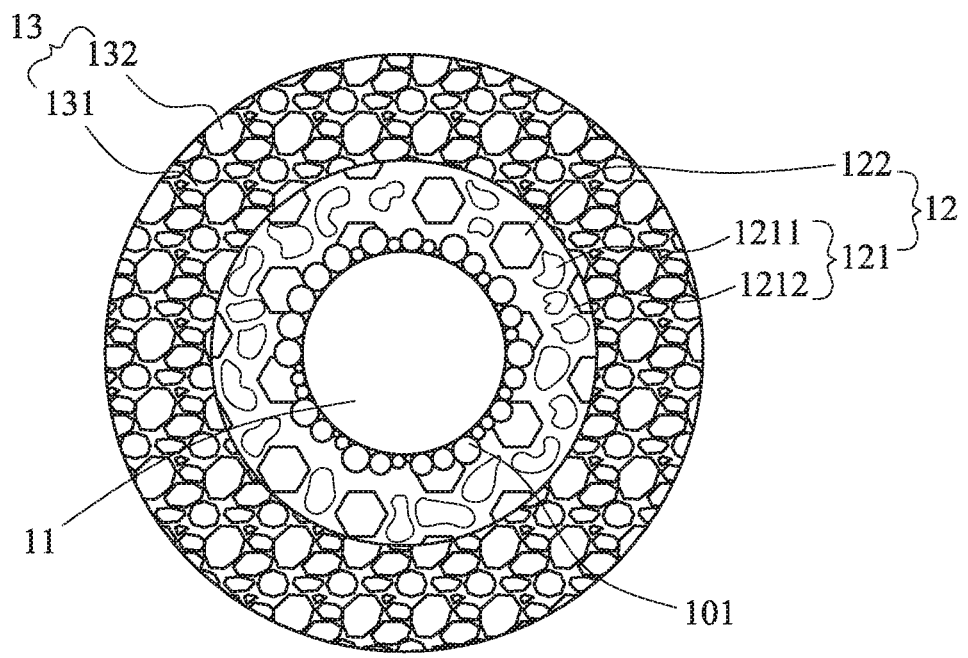
FIG. 3 is a schematic diagram with partial enlargement of another embodiment the composite electrode materials with improved structure of this invention.

Please refer to FIGS. 1-3, which are a schematic diagram of the composite electrode materials with improved structure of this invention, a schematic diagram with partial enlargement of the composite electrode materials with improved structure of this invention, and a schematic diagram with partial enlargement of another embodiment the composite electrode materials with improved structure of this invention. The composite electrode materials 10 of this invention includes a plurality of active material 11, a middle layer 12 and an outer layer 13. An artificial passive film (APF) 101 is formed on the outer surface of the active material 11 and covers the active material 11 to prevent or reduce the gel/liquid electrolytes to contact with the active material 11. Therefore, the artificial passive film (APF) 101 may be considered as an inner layer. The material of the APF 101 can be non-solid electrolyte series or solid electrolyte series based on the lithium ion transferring or not. The thickness of the APF 101 is substantially less than 100 nanometers. The non-solid electrolyte series may be selected from the group consisting of conductive materials, lithium-free ceramic materials and the combinations thereof. The lithium-free ceramic materials may include a zirconia, a silica, an alumina, a titanium oxide or a gallium oxide. Moreover, when the APF 101 is composed of the lithium-free ceramic materials, the APF 101 may be formed by a mechanical deposition, a physical/chemical deposition or the combinations thereof. For mechanical deposition, the ball mill or the Fluidized bed may be used. The thickness of the APF 101 is substantially less than 100 nanometers when the APF 101 is formed by the mechanical deposition. By the physical/chemical deposition, the film structure with atomic-scale stacked is formed. The thickness of the APF 101 may be substantially less than 20 nanometers thereof. When the APF 101 is composed of the conductive materials, the APF 101 may be formed by the same methods as mentioned above.

For such the APF 101 composed of the non-solid electrolyte series, the additional electrolyte is necessary as a media to transfer ions, in case of the thickness of the APF 101 being thicker. In case of the thickness of the APF 101 being thinner, such as the atomic-scale stacked film structure, the ion transfer could be made directly.

The solid electrolyte series may include oxide-based solid electrolyte, sulfide-based solid electrolyte, lithium-aluminum alloy solid electrolyte or lithium azide ($LiN_3$) solid electrolyte, which may be crystalline or glassy. When the APF 101 is selected from the conductive materials which may include a carbonaceous material (such as a graphite or a graphene) or a conductive polymer. In practice, the structure in FIG. 2 is better than the structure in FIG. 3. Also, in FIG. 2, the APF 101 is composed of solid electrolyte series preferably.

Further materials illustrations for the above solid electrolyte are described below. The sulfide-based solid electrolyte may be selected from one or more of the groups consisting of a glassy state of $Li_2S$—$P_2S_5$, a crystalline state of $Li_{x'}M_{y'}PS_{z'}$, and a glassy ceramic state of $Li_2S$—$P_2S_5$.

wherein M is selected from one or more of the groups consisting of Si, Ge, and Sn;

$$x'+4y'+5=2Z', 0 \leq y' \leq 1.$$

Preferably, the glassy state of $Li_2S$—$P_2S_5$ may be selected from one or more of the groups consisting of glassy state of $70Li_2S$-$30P_2S_5$, glassy state of $75Li_2S$-$25P_2S_5$, and glassy state of $80Li_2S$-$20P_2S_5$. The glassy ceramic state of $Li_2S$—$P_2S_5$ may be selected from one or more of the groups consisting of glassy ceramic state of $70Li_2S$-$30P_2S_5$, glassy ceramic state of $75Li_2S$-$25P_2S_5$, and glassy ceramic state of $80Li_2S$-$20P_2S_5$. The crystalline state of $Li_{x'}M_{y'}PS_{z'}$ may be selected from one or more of the groups consisting of $Li_3PS_4$, $Li_4SnS_4$, $Li_4GeS_4$, $Li_{10}SnP_2S_{12}$, $Li_{10}GeP_4S_{12}$, $Li_{10}SiP_2S_{12}$, $Li_{10}GeP_2S_{12}$, $Li_7P_3S_{11}$, $L_{9.5}4Si_{1.74}P_{1.44}S_{11.7}Cl_{0.3}$, $\beta$-$Li_3PS_4$, $Li_7P_2SI$, $Li_7P_3S_{11}$, $0.4LiI$-$0.6Li_4SnS_4$, and $Li_6PS_5Cl$.

The oxide-based solid electrolyte may be a fluorite structure oxide-based solid electrolyte. For example, it may be yttria stabilized zirconia (YSZ) with molar fraction 3-10%. The oxide-based solid electrolyte may be a $ABO_3$ oxide-based solid electrolyte, such as doping $LaGaO_3$. Or, the oxide-based solid electrolyte may be $Li_{1+x+y}(Al, Ga)_x(Ti, Ge)_{2-x}Si_yP_{3-y}O_{12}$, where $1 \leq s \leq 1$ and $0 \leq y \leq 1$. Moreover, the oxide-based solid electrolyte may be $Li_2O$—$Al_2O_3$—$SiO_2$—$P_2O_5$—$TiO_2$, $Li_2O$—$Al_2O_3$—$SiO_2$—$P_2O_5$—$TiO_2$—$GeO_2$, $Na_{3.3}Zr_{1.7}La_{0.3}Si_3PO_{12}$, $Li_{3.5}Si_{0.5}P_{0.5}O_4$, $Li_{3x}La_{2/3x}TiO_3$, $Li_7La_3Zr_2O_{12}$, $Li_{0.38}La_{0.56}Ti_{0.99}Al_{0.01}O_3$, or $Li_{0.34}LaTiO_{2.94}$.

As above-mentioned, based on the ion passing through the APF 101 itself or not, the structure design of the APF may be as following description. The APF 101 may complete cover the active material 11, the APF 101 has pores to allow the gel/liquid electrolytes to contact the surface of the active material 11, or the APF may be form the combinations of above.

Take FIG. 2 for example, the APF 101 essentially complete covers the active material 11 to prevent the gel/liquid electrolytes to contact the active material 11. Take FIG. 3 for example, the APF 101 has pores to allow the gel/liquid electrolytes to flow and contact slightly the surface of the active material 11. The APF 101 may be formed by powder-stacked non-solid electrolyte series. The powders-stacked structure may form pores to reduce the contact with the gel/liquid electrolytes and the active material 11. Besides, based on the structure of FIG. 3, the powders-stacked structure would support the solid electrolyte interface (SEI) layer, which is formed on the surface of the active material 11, to increase chemical, electrochemical and thermal stability. Therefore, the crack and the rebuilding of the SEI layer may be avoided. Moreover, the lithium ion consumption may be decreased. In FIGS. 2-3, the thickness of the APF 101 is about several to dozens of nanometers.

Then the following paragraph describe the middle layer 12 outside the APF 101 and the outer layer 13 outside the middle layer 12. In order to facilitate understanding the structure, the manufacturing process of an electrode is described firstly. General speaking, the electrode 10 is mixed with the active material 11, a conductive material, a binder and the gel/liquid electrolyte including the organic solvent and the lithium salt. In this invention, the APF 101 is formed on the surface of the active material 11. The active material 11 with the APF 101 is mixed with the conductive material, the binder and the gel/liquid electrolyte including the organic solvent and the lithium salt. Then the gel/liquid electrolyte is extracted to obtain a first volume M1 of the gel/liquid electrolyte. After the active material 11 is mixed with the conductive material and the binder, there would have a lot of holes with different sizes among the conductive material, the binder and the active material, result from the sizes of the particles and the material properties. In general, the larger holes would form or stack in the region where the solvent of the slurry is dried between the active materials. The diameters of the larger holes are about more than 500 nanometers, and/or the distance between the hole and the artificial passive film 101 is greater than 500 nanometers. The smaller holes would form in the regions where are closer to the surface of the active material 11 or/and are mixed with more conductive material and more binder. The diameters of the smaller holes are about less than 500 nanometers, and/or these holes, which are closer to the active material 11, are distributed from the outside of the artificial passive film 101 to 500 nanometers. In general, the total volume of the smaller holes is smaller than the total volume of the larger holes. Preferably, the total volume of the smaller holes is far smaller than the total volume of the larger holes.

The middle layer 12 includes a first deformable electrolyte 121 and a first undeformable electrolyte 122. The outer layer 13 includes a second deformable electrolyte 131 and a second undeformable electrolyte 132. Since the holes have to be filled with electrolytes, the electrolytes do not defined by the phase states of this invention to fill the spaces of the holes easily. In this invention, the electrolytes are defined as the deformable electrolyte and the undeformable electrolyte according to its hardness and compressibility. The undeformable electrolyte is the solid electrolyte with harder quality, which would not be deformed according to the size or the shape of the holes. Therefore, the undeformable electrolyte only can be roughly filled into the holes. The deformable electrolyte is the liquid electrolyte, the gel electrolyte or the wax-like electrolyte, which can be deformed according to the size or the shape of the holes. Therefore, the deformable electrolyte can be definitely filled in the remaining space of the holes after filing with the undeformable electrolyte.

The larger holes or the holes far away from the active material 11 are filled with more amount or higher concentration of the second undeformable electrolyte 132. The smaller holes or the holes closer to the active material 11 are filled with less amount or lower concentration of the first undeformable electrolyte 122. Then, the first deformable electrolyte 121 and the second deformable electrolyte 131 are filled in accordance with the distances from the active material. When filling with the first deformable electrolyte 121 and the second deformable electrolyte 131, the soft-solid electrolyte 1211 may be filled firstly. Then, at least one of electrolyte which may fill the gaps remaining between the undeformable electrolyte and the soft-solid electrolyte be selected from the ionic liquid, the ionic liquid electrolyte, the gel/liquid electrolyte 1212, or the combination thereof, see FIGS. 2 and 3. Therefore, the usage amount of the gel/liquid electrolyte is significantly reduced to prevent dangers caused by the gel/liquid electrolyte. As shown in FIGs, the first deformable electrolyte 121 of the middle layer 12 includes the soft-solid electrolyte 1211 and the gel/liquid electrolyte 1212. The second deformable electrolyte 131 of the outer layer 13 includes a soft-solid electrolyte and at least one electrolyte selected from an ionic liquid, an ionic liquid electrolyte, a gel/liquid electrolyte or a combination thereof.

Thus, a second volume M2 of the deformable electrolyte is obtained. Therefore, the first undeformable electrolyte 122 and the first deformable electrolyte 121 are filled in the holes within the range from the APF 101 to about 500 nanometers and/or the holes with diameter less than 500 nanometers to form the middle layer 12. The second undeformable electrolyte 132 and the second deformable electrolyte 131 are filled in the holes with distances from the APF 101 more than about 500 nanometers and/or the holes with diameter greater than 500 nanometers to form the outer layer 13. The active material 11 and related distributions in these drawings, FIGS. 1-3 for example, are merely schematic and are not intended to limit the distribution of the materials. In some holes, there are filling with the first undeformable electrolyte 122 and the second undeformable electrolyte 132 instated of the gel/liquid electrolytes. Thus, the second volume M2 will not be greater than the first volume M1. Moreover, a part of the volume in M2 is contributed from the soft-solid electrolyte. Therefore, it may significant reduce the usage amount of the gel/liquid electrolyte. The first deformable electrolyte 121 and the second deformable electrolyte 131 are the same or different materials. The first undeformable electrolyte 122 and the second undeformable electrolyte 132 are the same or different materials.

Thus, the content of the first deformable electrolyte 121 is more than the content of the first undeformable electrolyte 122 in the middle layer 12. The content of the second undeformable electrolyte 132 is more than the content of the second deformable electrolyte 131 in the outer layer 13. It is unquestionable that both the middle layer 12 and the outer layer 13 are include the conductive materials and the binder result from forming the electrode. In general, a volume content of the first deformable electrolyte 121 of the middle layer 12 is greater than 50% of total volume content of the first deformable electrolyte 121 and the first undeformable electrolyte 122 of the middle layer 12, preferably is greater than 90%. A volume content of the second undeformable electrolyte 132 of the outer layer 13 is greater than 50% of total volume content of the second deformable electrolyte 131 and the second undeformable electrolyte 132 of the outer layer 13, preferably is greater than 90%. Therefore, both of the improved safety (reducing the usage amount of the gel/liquid electrolyte) and the better ion-conduction (solving the problems of small contact area and poor contact surface between the solid electrolyte and the active material, and the lower charge transfer coefficient) are achieved.

The middle layer 12 is directly contacted to the active material 11 (or the APF 101) to transfer ions. If the middle layer 12 is mainly composed of the undeformable electrolyte, it would face the same problems as the conventional art, such as less and poor contact surface between the solid electrolyte and the active material and the low the charge transfer coefficient. Therefore, the middle layer 12 is mainly composed of the deformable electrolyte. The volume content of the first deformable electrolyte 121 is more than the volume content of the first undeformable electrolyte 122. The volume content of the first deformable electrolyte 121 of the middle layer 12 is greater than 50% of total volume content of the first deformable electrolyte 121 and the first undeformable electrolyte 122 of the middle layer 12, preferably is greater than 90%. It could be offer a better non-directional ion-conduction. Also, the state of the contact surface between the first deformable electrolyte 121 and the active material 11 (or the APF 101) is much better than the contact surface between the solid electrolyte and the active material. The charge transfer interface resistances are reduced. A distance between the middle layer 12 and the artificial passive film 101 is not greater than 500 nanometers, or the first deformable electrolyte 121 and the first undeformable electrolyte 122 of the middle layer 12 are filled into holes with a diameter less than about 500 nanometers. Therefore, the thickness of the middle layer 12 is not greater than 500 nanometers.

A distance between the outer layer 13 and the artificial passive film 101 is greater than 500 nanometers, or the second deformable electrolyte 131 and the second undeformable electrolyte 132 of the outer layer 13 are filled into holes with a diameter greater than about 500 nanometers. Therefore, the outer layer 13 is mainly composed of the undeformable electrolyte. The volume content of the second undeformable electrolyte 132 of the outer layer 13 is greater than 50% of total volume content of the second deformable electrolyte 131 and the second undeformable electrolyte 132 of the outer layer 13, preferably is greater than 90%. The usage amount of the organic solvent (the gel/liquid electrolyte) are reduced to acquire better thermal performance and maintain safety. In the outer layer 13, the direction of the ion conduction is determined by the contact the undeformable electrolyte of particles of the solid electrolyte. Therefore, the ion conduction is in a specific direction to allow the lithium ions to perform high speed and bulk transport.

The first undeformable electrolyte 122 of the middle layer 12 and the second undeformable electrolyte 132 of the outer layer 13 are selected from the hard-solid electrolyte, such as an oxide-based solid electrolyte, a lithium azide ($LiN_3$) solid electrolyte or a lithium-aluminum alloy solid electrolyte. Wherein, the oxide-based solid electrolyte may be a lithium aluminum titanium phosphate (LATP) electrolyte. The first deformable electrolyte 121 of the middle layer 12 and the second deformable electrolyte 131 of the outer layer 13 may include an ionic liquid, an ionic liquid electrolyte, a gel/liquid electrolyte, or a soft-solid electrolyte. Wherein, the soft-solid electrolyte is selected from a sulfide-based solid electrolyte, a hydride solid electrolyte or a polymer solid electrolyte. The polymer solid electrolyte includes polyethylene oxide (PEO), polyvinylidene fluoride (PVDF), polyacrylonitrile (PAN), polymethylmethacrylate (PMMA) and polyvinylchloride (PVC).

To further reduce the usage amount of the organic solvent, the first deformable electrolyte 121 of the middle layer 12 and the second deformable electrolyte 131 of the outer layer 13 may mainly include the ionic liquid, the ionic liquid electrolyte, or the soft-solid electrolyte. In other words, the major composition of the first deformable electrolyte 121 and the second deformable electrolyte 131 is the ionic liquid, the ionic liquid electrolyte, the soft-solid electrolyte, or a combination thereof. The proportion of the gel/liquid electrolyte is reduced.

Of course, the remaining undeformable or deformable electrolytes, which are not listed in detail above, may also be used. The above list are merely illustrative and are not intended to limit the invention to the foregoing undeformable or deformable electrolytes.

Figure 4:
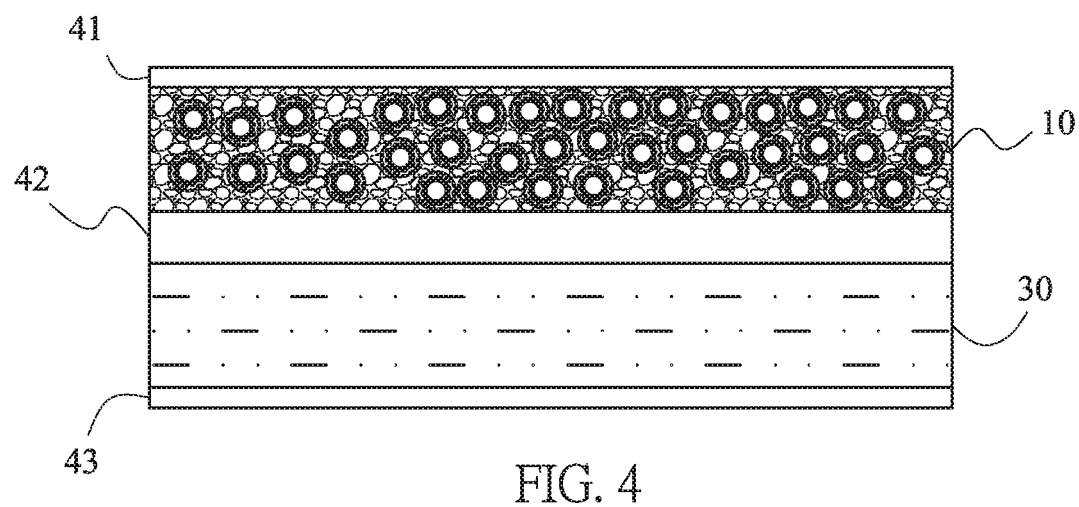
FIG. 4 is a schematic diagram of the composite electrode materials with improved structure adapted for a lithium battery of this invention.
Figure 5:
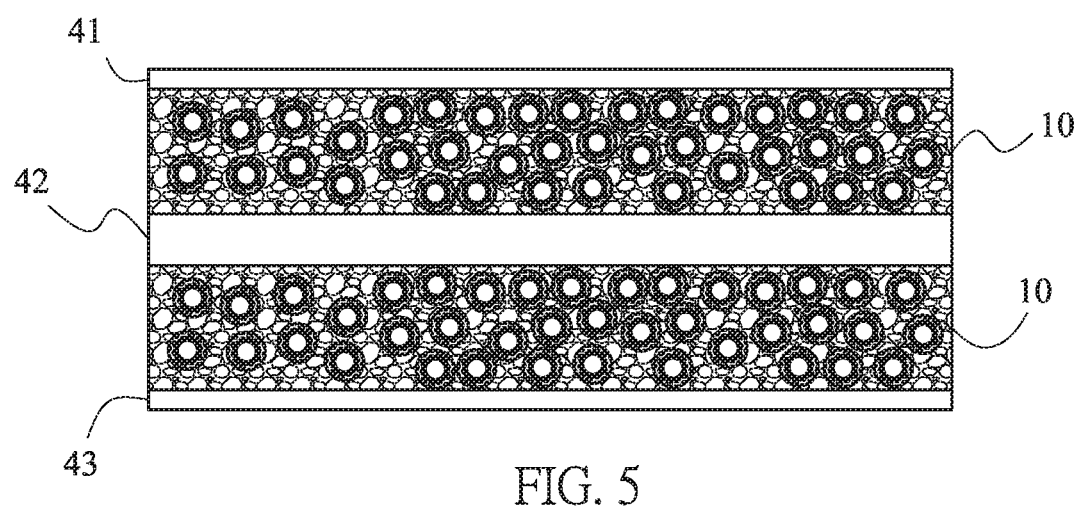
FIG. 5 is a schematic diagram of another embodiment of the composite electrode materials with improved structure adapted for a lithium battery of this invention.

Practically applied to the battery systems, the composite electrode materials 10 of this invention may serves as one electrode, such as positive electrode. Please refer to FIG. 4, the composite electrode materials 10, another electrode 30, the separator 42, and two current collectors 41, 43 are formed the battery system. Furthermore, both two electrodes, the positive electrode and the negative electrode, may use the composite electrode materials 10 of this invention, see FIG. 5.

Accordingly, in this invention, the artificial passive film (APF) is used to efficiently prevent or reduce the gel/liquid electrolytes to contact with the active materials. Therefore, the unnecessary lithium ion consumption and the attenuation of the lithium battery can be avoided. Also, the middle layer and the outer layer are constructed with different percentages of the undeformable electrolyte and the deformable electrolyte. Thus, the outer layer may allow the lithium ions to transfer in high speed, and the middle layer offer a non-directional ion-conduction. Therefore, a better ion-conduction is achieved. Besides, the usage amount of the organic solvent (the gel/liquid electrolyte) are reduced to acquire better thermal performance and maintain safety. And if the proportion of the ionic liquid or the ionic liquid electrolyte is increased, the amount of the organic solvent can be further reduced. Furthermore, the dual electrolyte system, the undeformable electrolyte and the deformable electrolyte, may effectively increase ion conduction. Especially, when the undeformable electrolyte is the oxide-based solid electrolyte, the high chemical stability is maintained. Also, the ionic conductivity and the electrode compatibility are increased through this dual electrolyte system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A composite electrode material, comprising:
   an active material;
   an artificial passive film, covering the active material;
   a middle layer, covering the artificial passive film, the middle layer including a first undeformable electrolyte and a first deformable electrolyte, wherein a volume content of the first deformable electrolyte is more than a volume content of the first undeformable electrolyte; and
   an outer layer, covering the middle layer, the outer layer including a second undeformable electrolyte and a second deformable electrolyte, wherein a volume content of the second undeformable electrolyte is more than a volume content of the second deformable electrolyte;
   wherein the first deformable electrolyte of the middle layer and the second deformable electrolyte of the outer layer are composed of a soft-solid electrolyte and at least one electrolyte selected from an ionic liquid, an ionic liquid electrolyte, a gel/liquid electrolyte or a combination thereof.

2. The composite electrode material of claim 1, wherein a thickness of the artificial passive film is less than 100 nanometers.

3. The composite electrode material of claim 1, wherein the artificial passive film is composed of a solid electrolyte, which totally covers the active material.

4. The composite electrode material of claim 1, wherein the artificial passive film is a non-solid electrolyte.

5. The composite electrode material of claim 4, wherein the artificial passive film is selected from the group consisting of conductive materials, lithium-free ceramic materials and the combinations thereof, wherein the conductive materials include a carbonaceous material or a conductive polymer, and the lithium-free ceramic materials include a zirconia, a silica, an alumina, a titanium oxide or a gallium oxide.

6. The composite electrode material of claim 1, wherein the first undeformable electrolyte of the middle layer and the second undeformable electrolyte of the outer layer are crystalline or glassy solid electrolyte.

7. The composite electrode material of claim 1, wherein a distance between the middle layer and the artificial passive film is not greater than 500 nanometers.

8. The composite electrode material of claim 1, wherein a distance between the outer layer and the artificial passive film is greater than 500 nanometers.

9. The composite electrode material of claim 1, wherein a volume content of the first deformable electrolyte of the middle layer is greater than 50% of total volume content of the first deformable electrolyte and the first undeformable electrolyte of the middle layer.

10. The composite electrode material of claim 9, wherein a volume content of the first deformable electrolyte of the middle layer is greater than 90% of total volume content of the first deformable electrolyte and the first undeformable electrolyte of the middle layer.

11. The composite electrode material of claim 1, wherein a volume content of the second undeformable electrolyte of the outer layer is greater than 50% of total volume content of the second deformable electrolyte and the second undeformable electrolyte of the outer layer.

12. The composite electrode material of claim 11, wherein a volume content of the second undeformable electrolyte of the outer layer is greater than 90% of total volume content of the second deformable electrolyte and the second undeformable electrolyte of the outer layer.

13. The composite electrode material of claim 1, wherein the composite electrode material serves as a positive electrode or a negative electrode of a lithium battery.

14. The composite electrode material of claim 1, wherein the first undeformable electrolyte of the middle layer and the second undeformable electrolyte of the outer layer are selected from an oxide-based solid electrolyte, a lithium azide ($LiN_3$) solid electrolyte or a lithium-aluminum alloy solid electrolyte.

15. The composite electrode material of claim 14, wherein the oxide-based solid electrolyte is a lithium aluminum titanium phosphate (LATP) electrolyte.

16. The composite electrode material of claim 1, wherein the soft-solid electrolyte is selected from a sulfide-based solid electrolyte, a hydride solid electrolyte or a polymer solid electrolyte.

17. The composite electrode material of claim 16, wherein the polymer solid electrolyte includes polyethylene oxide (PEO), polyvinylidene fluoride (PVDF), polyacrylonitrile (PAN), polymethylmethacrylate (PMMA) and polyvinylchloride (PVC).

* * * * *